United States Patent
Giorlando

(10) Patent No.: US 9,764,433 B2
(45) Date of Patent: Sep. 19, 2017

(54) EARRING FOR PIERCED EARS

(71) Applicant: Stephanie Giorlando, Alexandria, VA (US)

(72) Inventor: Stephanie Giorlando, Alexandria, VA (US)

(\*) Notice: Subject to any disclaimer, the term of this patent is extended or adjusted under 35 U.S.C. 154(b) by 736 days.

(21) Appl. No.: 13/660,669

(22) Filed: Oct. 25, 2012

(65) Prior Publication Data

US 2014/0116087 A1    May 1, 2014

(51) Int. Cl.
*A44C 7/00* (2006.01)
*B23P 5/00* (2006.01)
*B21D 53/44* (2006.01)

(52) U.S. Cl.
CPC .............. *B23P 5/00* (2013.01); *A44C 7/003* (2013.01); *B21D 53/44* (2013.01); *Y10T 29/23* (2015.01); *Y10T 29/49588* (2015.01)

(58) Field of Classification Search
CPC ........... A44C 7/00; A44C 7/001; A44C 7/003
USPC ....................................................... 63/12, 33
See application file for complete search history.

(56) References Cited

U.S. PATENT DOCUMENTS

| | | | |
|---|---|---|---|
| 396,661 A | 1/1889 | Luthy | |
| 459,476 A * | 9/1891 | Bulova | 63/12 |
| 2,354,067 A * | 7/1944 | Schmalz | 63/32 |
| 3,975,921 A * | 8/1976 | Pomaski | 63/13 |
| 4,129,998 A * | 12/1978 | Ferro | 63/12 |
| 4,214,456 A | 7/1980 | Hannum | |
| 4,468,936 A | 9/1984 | Kirk et al. | |
| 4,543,804 A * | 10/1985 | Cappiello | 63/12 |
| 5,020,338 A * | 6/1991 | Payne et al. | 63/12 |
| 5,076,072 A * | 12/1991 | Payne | 63/12 |
| 7,013,675 B2 * | 3/2006 | Marquez-Pickering | 63/12 |
| 2003/0154577 A1* | 8/2003 | Huang | 24/67 R |
| 2005/0055808 A1* | 3/2005 | Huang | 24/67 R |
| 2011/0099768 A1 | 5/2011 | Fleischmann | |
| 2011/0099777 A1 | 5/2011 | Corry | |
| 2012/0096897 A1* | 4/2012 | Bailey | 63/12 |

FOREIGN PATENT DOCUMENTS

| | | |
|---|---|---|
| EP | 0 007 773 A1 | 2/1980 |
| EP | 0 091 523 A1 | 10/1983 |

\* cited by examiner

*Primary Examiner* — Emily Morgan
(74) *Attorney, Agent, or Firm* — Oliff PLC

(57) ABSTRACT

An earring for a pierced ear includes an ornamental member and an earring post. The earring post includes a base, a first prong and a second prong. The earring post is made of a deformable metal so that the first prong and the second prong can be bent to secure the earring in an ear without requiring detachable pieces.

10 Claims, 3 Drawing Sheets

EARRING FOR PIERCED EARS

BACKGROUND

I. Related Technical Fields

Related technical fields include ornamental jewelry, including ornamental jewelry for pierced body parts. Related technical fields also include methods of making ornamental jewelry for pierced body parts. More specifically, related technical fields may include ornamental jewelry for pierced ears, such as earrings.

II. Related Art

Commonly, ornamental jewelry is fastened to the ear by inserting posts or wires through a hole in a portion of the ear resulting from a piercing. Once inserted, the post or wire needs to be secured in order to prevent the jewelry from sliding out of the hole. In the past, a few known securing mechanisms have been employed to ensure that the post or wire is secured.

Early on, artisans employed two separate pieces to craft an earring: (1) a post containing the ornamental portion of the earring, and (2) a locking mount or a holding nut that slidably engages to the post to prevent the post from sliding out of the hole. The holding nut usually has an opening for the shaft of the earring post to allow the holding nut to slide onto the shaft. The holding nut then advances along the shaft until securely engaging the shaft near the rear of the user's ear lobe, maintaining the earring in its locked position.

Earrings have also been developed so that each earring is a single piece or contains pieces that are not detachable by the user, to avoid the problem of losing earrings. For example, the shaft of the earring post may contain a loop, such as the one described in U.S. Pat. No. 4,214,456, and shown in FIG. 1. A straight ear contact portion 24 of the earring post is inserted through the hole in the portion of the ear resulting from the piercing. The emerging distal portion is grasped by one hand and the ornament 12 with the other hand and the distal portion is pulled in the direction that is bent. The ornament 12 is moved to the front side of the ear lobe.

As another example, earrings have been developed in which the earring post is split at the distal end of the shaft, such as the one described in U.S. Pat. No. 5,020,338 or the one described in U.S. Pat. No. 396,661 and shown in FIGS. 2 and 3, respectively. Payne describes an earring post that has a shaft 12 with a distal end 24 and a proximal end 28, and is split along the longitudinal axis in order to provide prongs. The prongs are biased outwards and require a sliding sleeve 63 to be slid over the prongs to bring them together. The distal end 24 of the shaft 12 is inserted into the hole in the ear lobe when each prong 66 is straightened by sliding the sleeve 63 over the prongs 66. After the shaft is inserted through the hole, the prongs are released by sliding the sleeve away from the prongs. After being released, the prongs return to their flexed and biased shape and secure the earring to the ear lobe.

SUMMARY

Removing earrings after only a few hours of use is often cumbersome, and users often prefer to wear the same pair of earrings for regular, daily wear. Thus, users often wear the earrings for an extended period of time, and in some situations, overnight. This is especially the case when traveling because users may be afraid that their earring will be lost. Users who have pierced ears require earrings that have an earring post that is narrow and pointed enough to allow the shaft to slide through the hole. These earrings are typically fastened such that a portion of the shaft of the earring post extends a distance away from the user's ear, as discussed above. When the user sleeps with these types of earrings on, the position of the user's head causes the earrings to shift such that distal ends of the earring posts may press against a portion of the user's head or neck, causing pain or discomfort. Therefore, it is undesirable for earring posts to have a portion that extends a distance away from the ear.

Earrings that use a holding nut are also problematic because the holding nut is small, and can be easily misplaced or lost. Additionally, due to the small size of the holding nut, it can be difficult for the user to fix the holding nut in place or remove the holding nut. Another problem with the holding nut is, after repeated use, the holding nut begins to wear, causing slippage of the holding nut while mounted in place. As a result, loss of the holding nut and loss of the entire earring can result.

Further, although there has been a trend to make earring posts a single piece, these earring posts contain a portion that extends a distance away from the user's ear. Accordingly, a portion of the earring posts may press against a portion of the user's head or neck, causing pain or discomfort. For example, U.S. Pat. No. 4,214,456, the loop abutting the back end of the ear lobe extends a distance away from the ear lobe such that if the user applies pressure to the ear lobe by resting his head to the side, he would feel discomfort.

Although some designs utilize a split post, such as U.S. Pat. Nos. 5,020,338 and 396,661, these designs have the prongs at a fixed distance, and thus, encounter the same problem discussed above regarding discomfort for the user. In U.S. Pat. No. 5,020,338, the prongs extend a distance away from the ear lobe, encountering the same problem discussed above. U.S. Pat. No. 396,661 also encounters similar problems. Additionally, the above mentioned designs are not ideal because users typically have ear lobes with different thicknesses. The above mentioned designs prevent the user from adjusting prongs because the prongs are not deformable. That is, users would be unable to customize the degree in the bend of the post and deform the prongs to ensure a snug and comfortable fit. Users cannot ensure that the ornament lays flat against the ear lobe.

Exemplary implementations of the broad inventive principles described herein provide an earring that includes an earring post having a first prong and a second prong.

Exemplary implementations of the broad inventive principles described herein provide that the earring post is a single metal piece that has several v-shaped cut-outs to form a plurality of ridges and a plurality of valleys. The metal sheet is also cut to form a first projection portion located at a first end of the single metal piece and a second projection portion is located at a center of the single metal piece. The first end of the single metal piece is joined to a second end of the single metal piece, to form a setting for an ornamental member.

Exemplary implementations of the broad inventive principles described herein provide an earring post that is inserted through the hole in the portion of the ear resulting from the piercing. After insertion, each projection portion of the earring post is bent such that each prong rests against the ear. These broad inventive principles secure the earring post to the user's ear while maintaining comfort when pressure is applied to the ear, and allow the ornament to lay flat against the ear lobe.

Figure 1:
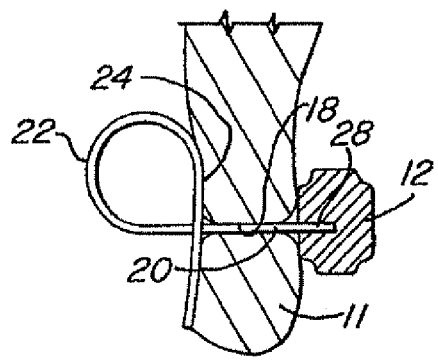
FIGS. 1-3 illustrate earrings of the related art.
Figure 2:
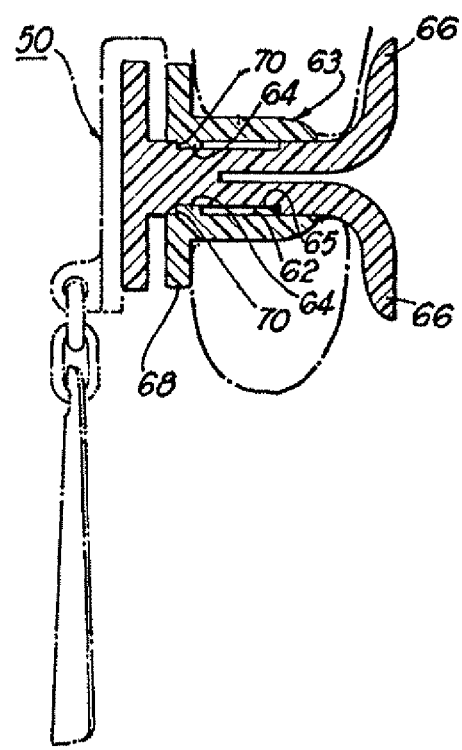
Figure 3:
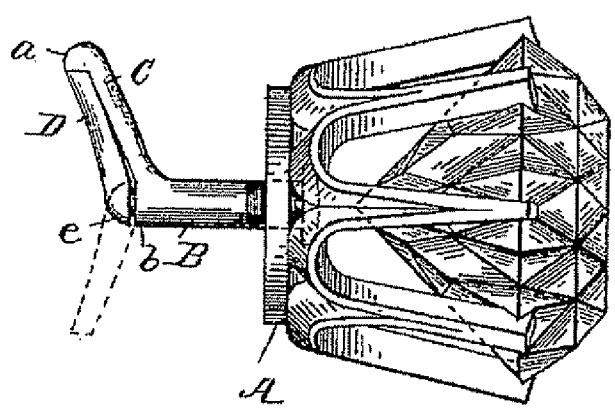
Figure 4:
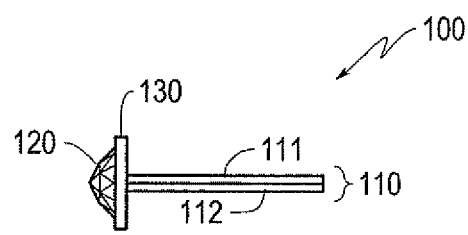

Exemplary implementations can be described with reference to the following figures wherein:

FIG. 4 illustrates a side view of an earring.

Figure 5:
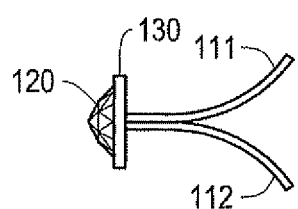

FIG. 5 illustrates a side view of an earring having a flexed post.

Figure 6:
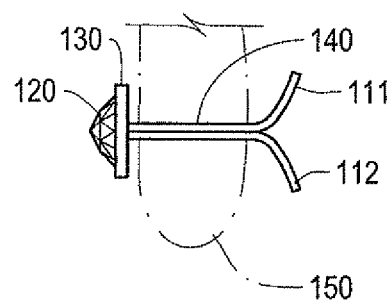

FIG. 6 illustrates a side view of an earring on a user's ear.

Figure 7:
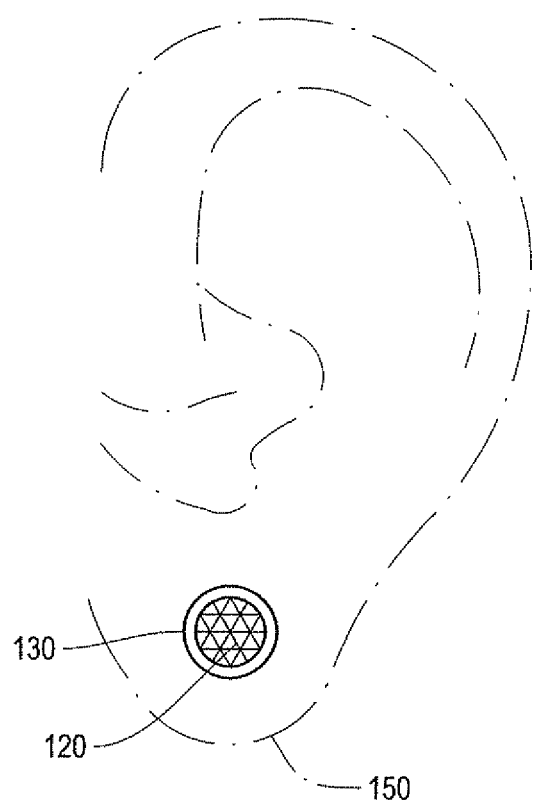

FIG. 7 illustrates a top view of an earring on a user's ear.

Figure 8:
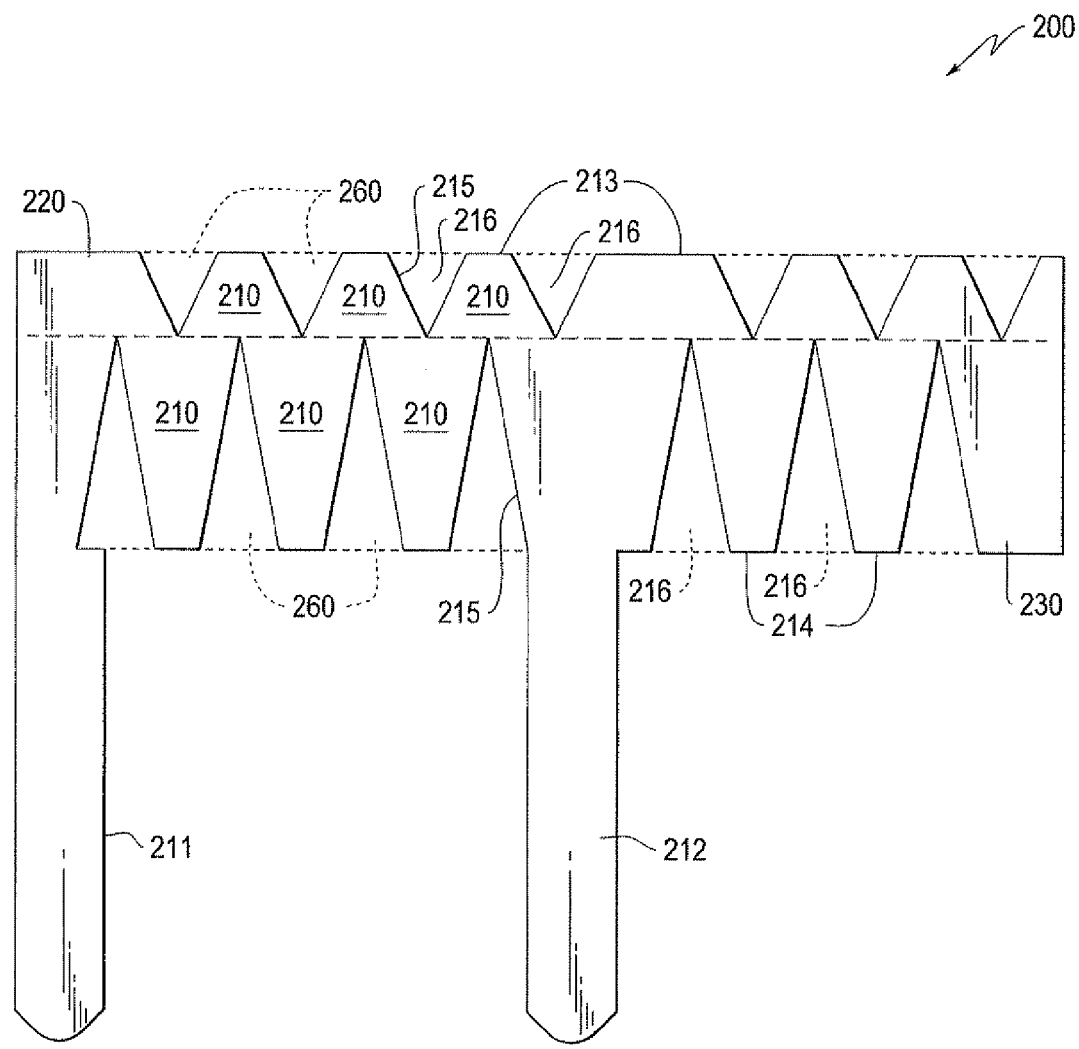

FIG. 8 illustrates a plain view of a metal sheet for making an earring post.

DETAILED DESCRIPTION OF EXEMPLARY IMPLEMENTATIONS

Referring to the drawings, FIG. 4 shows an exemplary earring 100 in a side view. The earring 100 preferably includes a post 110, an ornamental member 120 and a setting 130. The post 110 preferably includes a first prong 111 and a second prong 112. The post 110 is pushed through the hole in the ear lobe while the first prong 111 and the second prong 112 are straight.

The earring 100 is meant to provide comfort for all users, regardless of the thickness of the user's ear. In order to accomplish this, as shown in FIG. 5, the first prong 111 and the second prong 112 may be deformable along the entire length of each prong. Thus, after the user has inserted the first prong 111 and the second prong 112 through the hole 140, the user may bend each prong at any portion of the prong in order to ensure a snug and comfortable fit.

Because the prongs 111 and 112 may be bent and straightened each time the user puts on and removes the earring, the post 110 is preferably made of a material that the user can bend easily. The material is preferably strong enough to withstand bending and wear over time. Examples of such a material include vermeil or yellow gold.

In order to demonstrate the manner in which the earring 100 is worn, FIG. 6 shows that, after the post 110 is pushed through the hole 140, the user can bend the first prong 111 and the second prong 112 such that the first prong 111 abuts the backside surface of an upper portion the ear 150 and the second prong 112 abuts the backside surface of a lower portion of the ear 150.

The user can bend prongs 111 and 112 at any portion based on how tight or loose the user would like to wear the earrings. If the user finds that the fit is too tight or too loose, the user can simply straighten the prongs 111 and 112, and bend the prongs 111 and 112 again at a different portion of the prongs. The flexible nature of the earring allows the prongs 111 and 112 to bend such that the prongs 111 and 112 press flat against the back side of the user's ear 150. Consequently, when pressure is applied to the ear, the user will not feel any pain or discomfort.

As shown in FIG. 7, the earring is worn such that the ornamental member 120 is disposed on the front side of the ear 150.

FIG. 8 illustrates a metal sheet 200 which is used to make the post 110. V-shaped cutouts 260 can be made along outer edges 213 and 214 and inner edges 215 of the metal sheet 200. The outer edge 213 is opposite the outer edge 214. As a result, a plurality of ridges 210 are disposed along the outer edge 213 of the metal sheet 200 and along the outer edge 214 of metal sheet 200, and a plurality of valleys 216 are disposed between each ridge 210.

The ridges 210 that are along the top of the metal sheet 200 are aligned with the valleys 216 along the bottom of the metal sheet 200. The ridges 210 that are along the bottom of the metal sheet 200 are aligned with the valleys 216 along the top of the metal sheet.

Preferably, the valleys 216 and the ridges 210 disposed on the outer edge 213 extend less than half the width of the metal sheet 200.

Preferably, the valleys 216 and the ridges 210 disposed on the outer edge 214 extend more than half the width of the metal sheet 200.

The metal sheet 200 also includes a first projection portion 211 and a second projection portion 212. The first projection portion 211 extends from the first end 220 of the metal sheet 200. The second projection portion 212 extends from the center of the metal sheet 200.

During the making of the earring post 110, the metal sheet is folded along a fold line 250. Then, a surface of a first end 220 of the metal sheet 200 abuts or contacts a surface of a second end 230. The inner edges 215 of each of the plurality of V-shaped ridges 210 contacts each together so that the plurality of ridges forms a bezel setting. The ornamental member 120 is placed in the setting. The ornamental member 120 preferably being a shallow rose cut stone.

After the first end 220 of the metal sheet 200 contacts the second end 230 of the metal sheet, the first projection portion 211 and second projection portion 212 extend from the setting, as shown in FIG. 4, forming the first and second prongs 111 and 112.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying inventive principles.

What is claimed is:

1. An earring for a pierced ear comprising:
   an ornamental member; and
   a setting including a bottom surface, the ornamental member being disposed in the setting;
   an earring post that includes:
   a first prong, the first prong extending from the bottom surface of the setting;
   a second prong separate from the first prong, the second prong extending from the bottom surface of the setting,
   wherein:
   the first prong and the second prong are made of a malleable metal and the first prong and the second prong are bent from a first resting position into a second resting position, and
   the earring post is adapted to be inserted into the pierced ear.

2. The earring in accordance with claim 1, wherein the first prong and the second prong are deformable.

3. The earring in accordance with claim 1, wherein the earring post is made of a deformable material.

4. The earring in accordance with claim 1, wherein the ornamental member is a rose cut stone.

5. The earring in accordance with claim 1, wherein the setting is a bezel setting.

6. The earring in accordance with claim 1, wherein the first prong includes:
   a first side surface, and
   a second side surface, at least a portion of the first side surface being adjacent to a user's ear when the earring is worn, and at least a portion of the second side surface being adjacent to a surface of the second prong.

7. The earring in accordance with claim 1, wherein the second prong includes:
   a first side surface, and
   a second side surface, at least a portion of the first side surface being adjacent to a user's ear when the earring is worn, and at least a portion of the second side surface being adjacent to a surface of the first prong.

8. The earring in accordance with claim 1, wherein the earring post is made of yellow gold.

9. The earring in accordance with claim 1, wherein an entire portion of the first prong is deformable.

10. The earring in accordance with claim 1, wherein an entire portion of the second prong is deformable.

\* \* \* \* \*